United States Patent
Alford et al.

(10) Patent No.: US 11,511,560 B2
(45) Date of Patent: Nov. 29, 2022

(54) FINE TIP STYLUS ND PEN WITH APERTURE FOR COAXIAL, RETRACTION AND PLACEMENT

(71) Applicants: John Alford, Kenosha, WI (US); Peter Veiga, Zion, IL (US); Fang Te Hsiang, New Taipei (TW)

(72) Inventors: John Alford, Kenosha, WI (US); Peter Veiga, Zion, IL (US); Fang Te Hsiang, New Taipei (TW)

(73) Assignee: Konnectronix, Inc.

( * ) Notice: Subject to any disclaimer, the term of this patent is extended or adjusted under 35 U.S.C. 154(b) by 381 days.

(21) Appl. No.: 16/665,863

(22) Filed: Oct. 28, 2019

(65) Prior Publication Data

US 2020/0130404 A1 Apr. 30, 2020

Related U.S. Application Data

(60) Provisional application No. 62/752,132, filed on Oct. 29, 2018.

(51) Int. Cl.
| | |
|---|---|
| *B43K 24/02* | (2006.01) |
| *B43K 29/00* | (2006.01) |
| *G06F 3/0354* | (2013.01) |
| *G06F 1/26* | (2006.01) |
| *H02J 7/22* | (2006.01) |

(52) U.S. Cl.
CPC .............. *B43K 24/02* (2013.01); *B43K 29/00* (2013.01); *G06F 1/26* (2013.01); *G06F 3/03545* (2013.01); *H02J 7/225* (2013.01); *Y02E 60/10* (2013.01)

(58) Field of Classification Search
CPC ........ B43K 24/02; B43K 24/00; B43K 24/10; B43K 29/00; B43K 29/08; B43K 29/18; G06F 3/03545; G06F 1/26; Y02E 60/10; Y02E 60/00; H02J 7/225; H02J 7/22
USPC ...................................... 401/29–33, 258–260
See application file for complete search history.

(56) References Cited

U.S. PATENT DOCUMENTS

| | | | |
|---|---|---|---|
| 6,450,721 B1 * | 9/2002 | D'Amico .............. | B43K 25/026 401/258 |
| 7,854,559 B2 * | 12/2010 | Liu ........................ | B43K 27/04 401/99 |
| 8,803,851 B2 * | 8/2014 | Lin ...................... | G06F 3/03545 345/184 |

* cited by examiner

*Primary Examiner* — David J Walczak
(74) *Attorney, Agent, or Firm* — Vitale, Vickrey, Niro & Gasey LLP

(57) ABSTRACT

A writing instrument for alternating between an active stylus tip and an ink pen tip which is retractable from and displaceable through an annular opening at one end of the writing instrument.

4 Claims, 4 Drawing Sheets

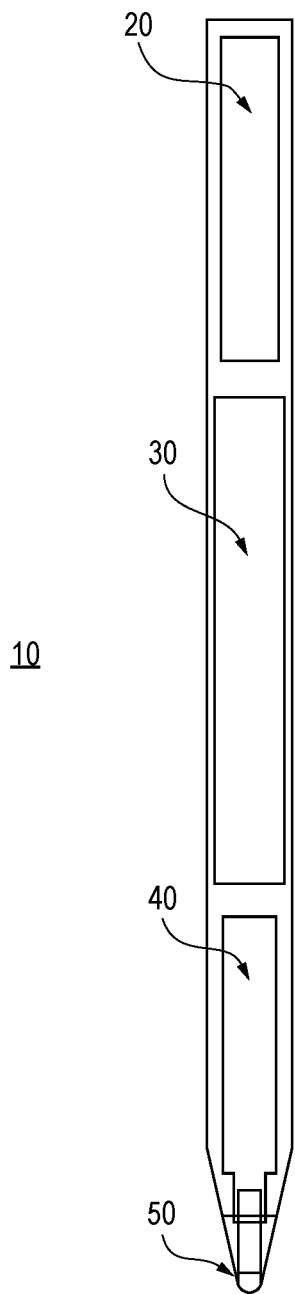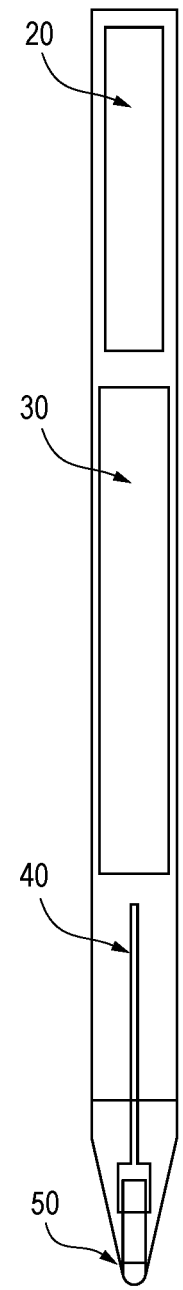
FIG. 1A
PRIOR ART
FIG. 1B
PRIOR ART

FINE TIP STYLUS ND PEN WITH APERTURE FOR COAXIAL, RETRACTION AND PLACEMENT

CLAIM OF PRIORITY

The present invention claims priority to Provisional U.S. Patent Application 62/752,132, filed on Oct. 29, 2018.

FIELD OF INVENTION

The present disclosure relates to a pen having a first end and a second (tip) end for applying an fine tip, active stylus for writing on an electronic tablet surface or the like, or, alternatively, a pen tip for writing upon paper or other ink impressionable surfaces. More specifically, the present disclosure includes a pen tip and a stylus tip which can extend through the same annular opening of a pen barrel, wherein the stylus tip and/or the pen tip is retractable so as to alternate between applications.

BACKGROUND OF THE INVENTION

The use of stylus tips to simulate writing tool for electronic tablet surfaces and the like have been well known for some time. Generally, there exist passive, conductive stylus tips which work off of static electricity derived from the user, and active or powered stylus tips that require the use of a battery, but provide better operational function. In addition, a common approach available for stylus tip products involve the use of broad tipped and fine tipped stylus heads. While broad tipped stylus surfaces enable more "landscape" to provide a pen combination solution, such stylus tips have the tendency to obscure the writing surface being contacted, and feel and work less like a typical writing instrument, and thus are less desired than fine tip stylus solutions.

Regardless of the type of active stylus tip, however, there are no available products that permit a user to easily switch from a tip for an active stylus to a pen tip for writing with ink without switching ends of the instrument (e.g., through the use of a cap or similar component which could be lost).

What is needed is a combination electronic and ink writing instrument including the ability to retract the ink pen type and/or the fine stylus tip in order to switch quickly from one writing surface to another using the same pen tip region, and without the need to move or switch components that could be lost.

DEFINITION OF TERMS

The following terms are used in the claims of the patent as filed and are intended to have their broadest plain and ordinary meaning consistent with the requirements of the law.

A fine stylus tip is a stylus tip with a diameter of 3 mm or less, preferably 2.4 mm or less.

An active stylus is an input device with a battery or similar power source that includes electronic components and allows users to write directly onto the display of a computing device.

A stylus power activation mechanism is a device for connecting the power source (e.g., a battery and power PCB circuit) with a control board in order to send an electronic signal from the active stylus to the electronic touch screen during engagement. Examples of such power activation mechanisms including manually activated sliding components, or pen barrel components with electric contacts for twisting to provide engagement between the power source and the control board.

A control board is a PCB that allows the stylus tip to communicate with the touch screen controller via a electrical signal.

A power PCB circuit is a battery source plus, preferably a connector, such as a USB connector, and preferably related circuitry for supplying a recharge to the battery source.

An annulus tip refers to an opening in a stylus surface which can accommodate an ink pen tip therethrough. This tip, however, does not preclude mechanisms in the stylus tip PCB or components of the pen from being otherwise axially offset from one another.

A ceramic tip refers to a ceramic or any other material which does not interfere with the capacitive function of the stylus tip.

Where alternative meanings are possible, the broadest meaning is intended. All words used in the claims set forth below are intended to be used in the normal, customary usage of grammar and the English language.

OBJECTS AND SUMMARY OF THE DISCLOSURE

The apparatus and method of the present disclosure includes a generally cylindrical writing instrument that is comprised of a first end and a second end. At the first end is a main PCB or similar circuitry and a battery powering the stylus, as well as other optional features such as a USB port for recharging the battery. Towards the second end is a tip PCB and pen components (such as a pen tip or nib). The second end of the writing instrument an annular opening tor receiving a pen tip and/or a stylus tip (preferably a fine stylus tip) therethrough. The tip PCB is offset or shifted axially to one side to allow the pen to slide through the center of the stylus tip. In an alternative version, the pen tip and stylus tip are essentially in parallel with one another, and can be alternatively urged through the annulus at the second end. The pen tip region may be of ceramic so as to avoid interference with the electrical functionality of the stylus. The body of the pen may be constructed of a conductive material to enable a grounding connection with a ground wire or lead extending from the main PCB to the body of the pen.

The pen tip and/or stylus tip may be extended or retracted through the annulus of the stylus through a twisting mechanism between top and bottom pen portions. In one embodiment, the stylus tip is adjacent a second (control) PCB which, when the twisting mechanism is actuated, creates an electrical contact between the main PCB and the control PCB to power the stylus when extended. In a further variant, the stylus tip either with or without the control PCB) may be moved up and down via a sliding mechanism instead of twisting so as to extend and retract the fine stylus tip.

The immediate application of the present invention will be seen in active, batter powered line tip stylus devices, though those of skill will see that the present invention could be applied to passive or broad tip stylus devices where quick and easy rotation between electronic and ink writing surfaces may be advantageous.

Thus can be seen that one object of the present invention is to provide a mechanism for combining a pend tip and an active stylus tip in a single end of a writing instrument.

A further object of the present invention is to provide a mechanism for retracting and extending a pen tip with ease through a fine stylus tip.

Still another object of the present invention is to provide a retractable and extendable fine stylus tip which can be withdrawn as desired to provide a user with a truer pen operation.

Yet another object of the present invention is to provide a line stylus tip and an ink pen in a single writing instrument.

It should be noted that not every embodiment of the claimed invention will accomplish each of the objects of the invention set forth above. In addition, further objects of the invention will become apparent based on the summary of the invention, the detailed description of preferred embodiments, and as illustrated in the accompanying drawings. Such objects, features, and advantages of the present invention will become more apparent in light of the following detailed description various embodiments thereof, and as illustrated in the accompanying drawings.

BRIEF DESCRIPTION OF THE DRAWING

FIGS. 1a and 1b show existing stylus pen layouts as known in the art.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

FIGS. 1a and 1b show standard, known elements of a stylus pen cylinder 10, including a main PCB 20, a battery 30, a tip PCB 40 and a stylus tip 50.

Figure 2A:
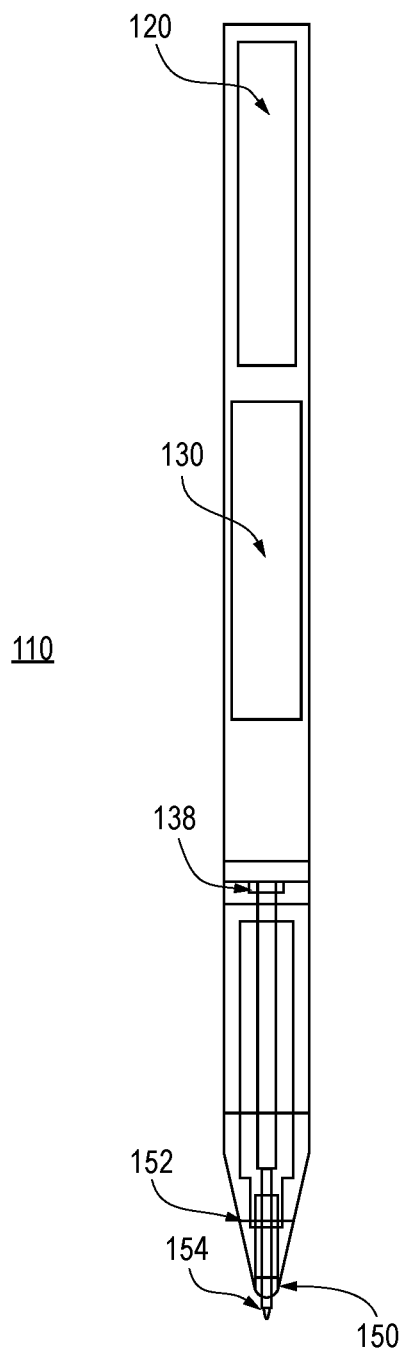
FIGS. 2a and 2b show front and side views, respectively, of a retractable pen tip in accordance with one embodiment of the present invention.
Figure 2B:
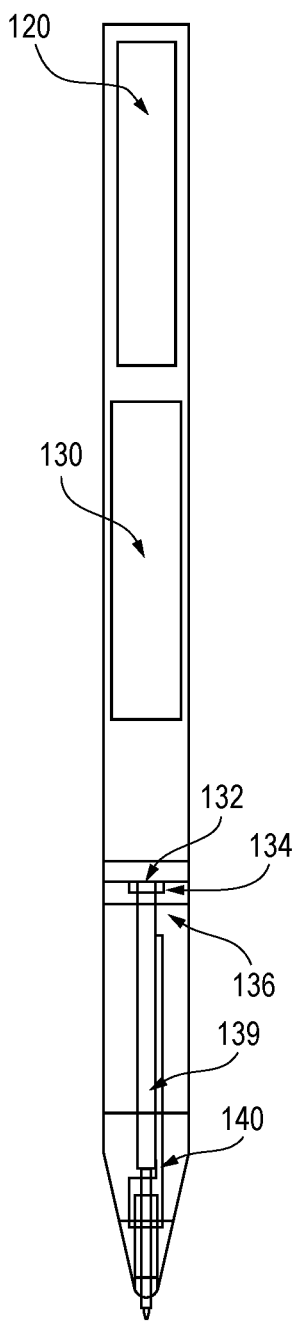

FIGS. 2a and 2b, by comparison, show a first preferred embodiment of a combination ink pen and stylus pen cylinder 110 comprising a main PCB 120, a battery 130, a tip PCB 140 and a stylus tip 150. In addition, the cylinder 110 houses a pen comprised of the top portion 134, the bottom portion 136, a replaceable ink cartridge 139, a mechanism 132 for extending and retracting the pen, and an electrical connection 138 to separate the top 134 and bottom 136 portions and to allow the top to rotate such that the pen tip 154 extends and retracts. In addition the stylus tip 150 of this embodiment defines a hole or annulus 152 that allows the pen tip to extend and retract therethrough, with the pen tip 154 preferably being a ceramic or similar material so as to prevent electrical interference with the fine stylus tip 150.

Figure 3A:
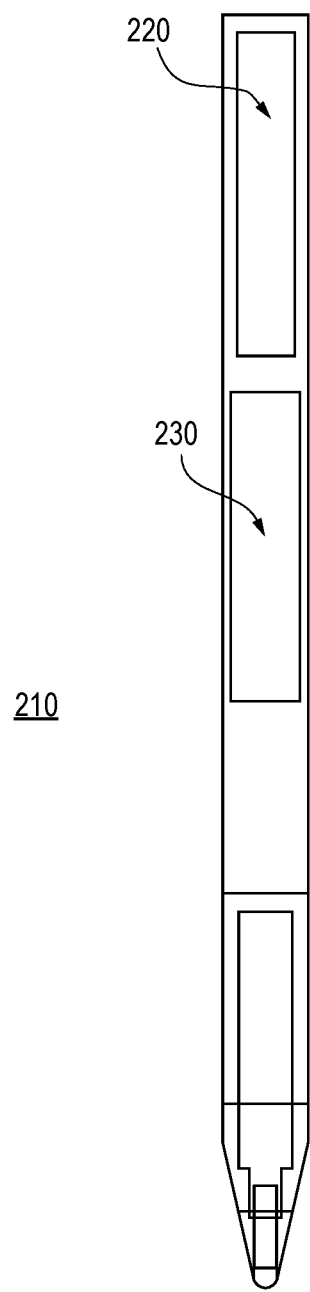
FIGS. 3a and 3b show front and side views, respectively, of a retractable fine stylus tip in accordance with another embodiment of the present invention.
Figure 3B:
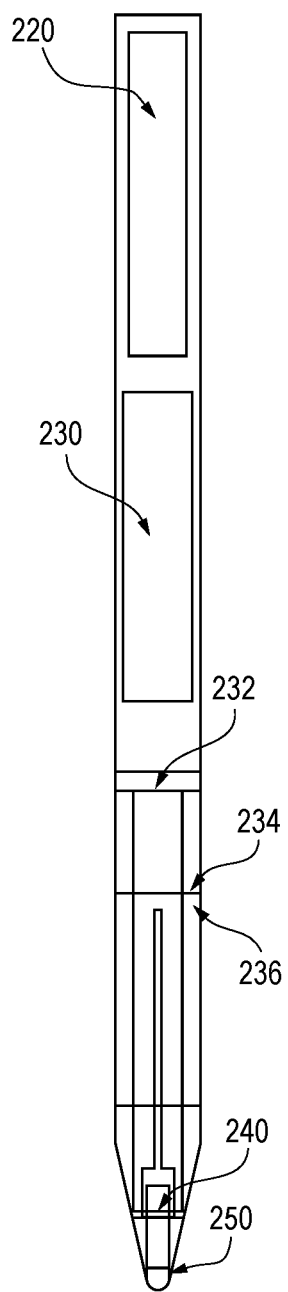

FIGS. 3a and 3b, by comparison, show a similar but different embodiment cylinder 210 comprising a main PCB 220, a battery 230, a tip PCB 240 and a stylus tip 250. This embodiment is very similar to the first embodiment, with the exception that the mechanism 232 for extending and retracting the tip instead enables retraction and extension of the stylus tip 250 so as to enable the user to feel that a truer pen operation in practice. Of course, those of skill in the art will appreciate that that the above described two embodiments need not operate exclusive of one another. That is, the present invention is intended to disclose and teach a writing instrument wherein the ink pen and/or the stylus pen are retractable and extendable for operation.

Figure 4:
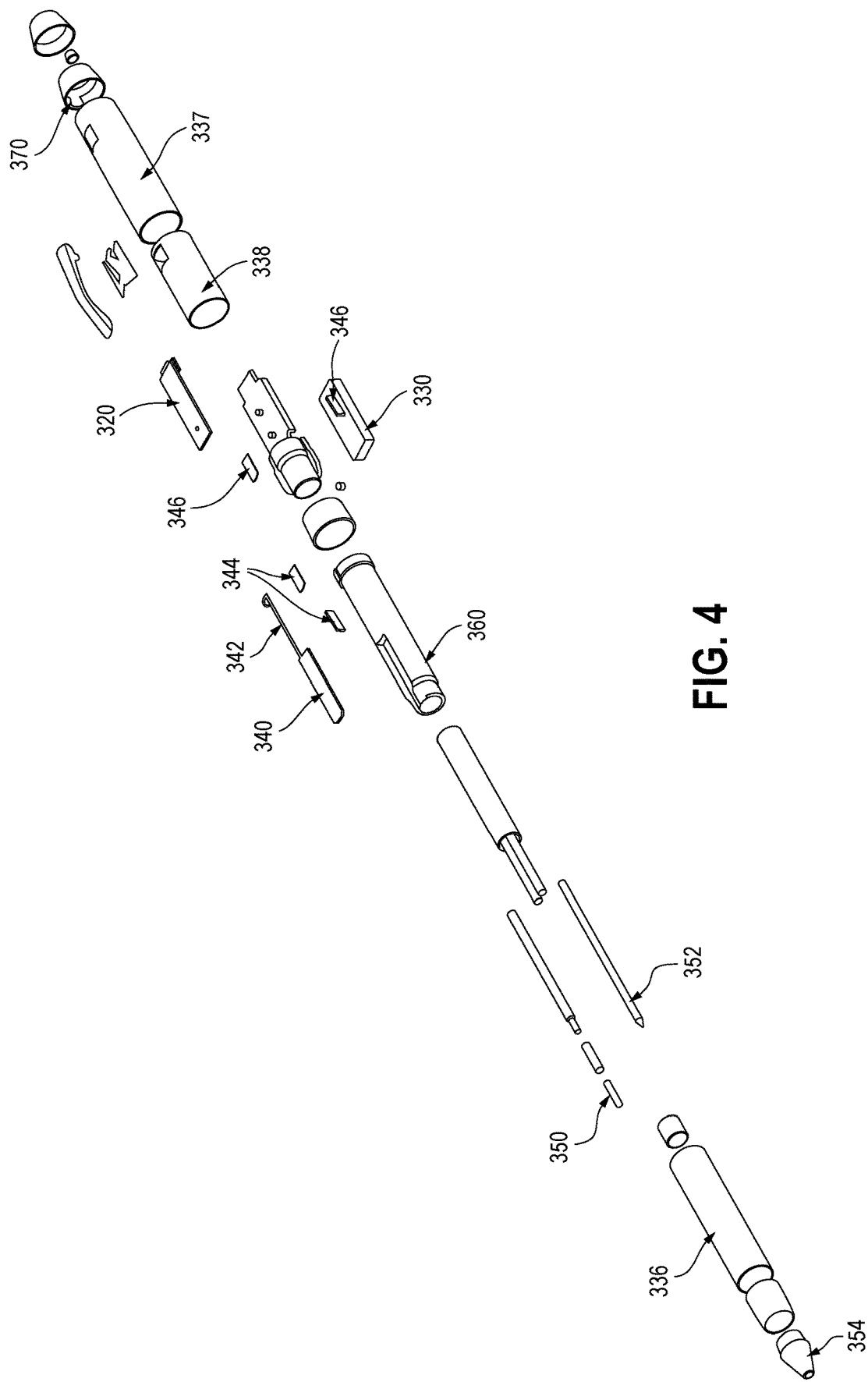
FIG. 4 shows an exploded perspective view of a retractable stylus and pen tips in accord with another embodiment of the present invention.

Another alternative embodiment is disclosed in FIG. 4. As with the other embodiments, the device includes cylinder 310 made up of a barrel portion 336 at the second end, a cap portion 337 at the first end with a cap sleeve 338 extending therefrom to slidingly engage the barrel portion 336.

In the cap portion is contained a main or power PCB 320, a battery 330, and cap connectors 346 on the cap sleeve 338 for the cap portion 337 to deliver power from the battery. Optionally, the cap portion 337 can also include a power port insulator 370 for housing a USB connector (not shown) for recharging the battery 330.

In the barrel portion 336 is located a front or tip PCB 340 and a barrel insert 360 for holding a stylus tip 350 and a pen insert 352 for user selection. User selection enables extension and retraction of the stylus tip 350 or pen 352, as desired, through the tip 354 connected to the barrel portion 336, the tip 354 defining an annular opening. The barrel portion 336 further has connected thereto barrel connectors 344 for selectively receiving power to be provided to the tip PCB 340 by the battery 330 through front PCB wire 342 which then extend through to power the stylus tip 350. The user can manually rotate the cap portion 337 in either a clockwise or counterclockwise rotation to select either the stylus 350 or pen 352 in a manner known to those of skill in the art. However, in the event the user rotates cap portion 337 in a direction to actuate the stylus tip 350 through the tip 354, such rotation will at the same time cause the cap connectors 346 to contact the barrel connectors 344, thus delivering power from battery 330 to the front or tip PCB 340, which creates an active charge in the stylus tip 350 such that the tip can communicate with sensors in the screen of an electronic touch screen while extended, while disconnecting or powering down the stylus tip 350 upon retraction through the tip.

In at least some preferred embodiments, the use of a non-metallic tip 354, whether plastic or ceramic or a comparable material may be desirable to avoid interfering with the capacitive functioning of the stylus tip 350 while engaged. Similarly, the selection of conductive materials for the barrel portion 336 and the cap portion 337 can likewise be important to enable the electrical grounding of the tip PCB 340 and the main or power PCB 320 via ground wires (not shown). Further, it should be noted that this embodiment enables the fixed placement of the tip PCB 340 in the barrel portion 336 such that the actuation of the stylus tip 350 causes movement of the stylus tip relative to the tip PCB 340.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the specific pen extension and retraction mechanisms used in the examples of the preferred embodiments of present invention is for illustrative purposes with reference to the example drawings only. Also, while the certain preferred embodiment deals with active stylus pens having a fine tip, the invention may be applicable to other forms of stylus, too. Similarly, it will be appreciated by those skilled in the art that various changes, additions, omissions, and modifications can be made to the illustrated embodiments without departing from the spirit of the present invention.

All such modifications and changes are intended to be covered by the following claims.

What is claimed is:

1. A combination active, tip stylus and ink pen comprising:
   a) a cylinder defining an annulus, the cylinder having a first end and a second end;
   b) a battery and a main PCB circuit proximate the first end of the cylinder for powering the stylus;
   c) an active stylus tip disposed at the second end of the cylinder, the stylus tip defining a second annulus coaxial with the annulus of the cylinder; and
   d) at least one ink pen tip retractable and extendable through the second annulus;
   Whereby a user can select between the stylus tip and the at least one ink pen tip for application from the second end of the cylinder.

2. A combination active stylus and ink pen comprising:
   a) a cylinder defining an annulus, the cylinder having a first end and a second end;
   b) a battery and a power PCB circuit proximate the first end of the cylinder for powering the stylus;
   c) an active stylus having a stylus tip and an ink pen tip disposed at the second end of the cylinder, the active stylus and ink pen tip parallel with one another, the active stylus further being in electrical communication with a control board proximate the second end of the cylinder, the control board enabling the translation of movement by the stylus tip to an electronic touch screen in communication with the stylus tip; and
   d) a stylus power activation mechanism for selectively coupling the power PCB circuit and the control board upon the extension of the stylus tip through the second end of the cylinder;
   whereby a user can select between the stylus tip and the at least one ink pen tip for application from the second end of the cylinder.

3. The combination active stylus and ink pen of claim 2, wherein the control board has a fixed relationship with at least the second end of the cylinder, and the control board had a moving relationship with the stylus tip during actuation of the stylus tip.

4. The combination active, fine tip stylus and ink pen of claim 2, wherein the stylus power activation mechanism comprises a first end portion of the cylinder and a second end portion of the cylinder, wherein the first end portion may be rotated to enable electrical communication between the power PCB and the control circuit.

* * * * *